Jan. 3, 1928.
E. GRICE
1,654,802
POULTRY FOUNTAIN
Filed March 21, 1927
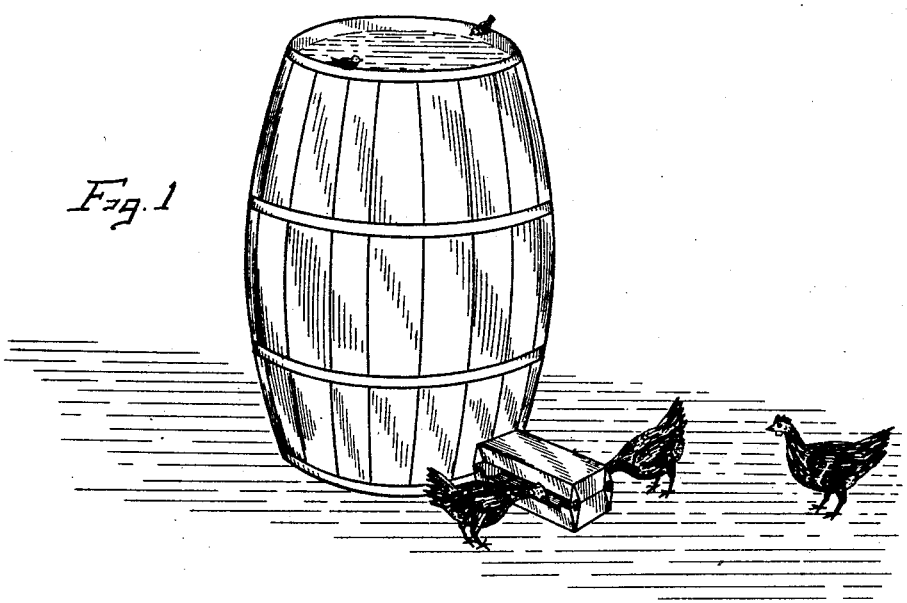
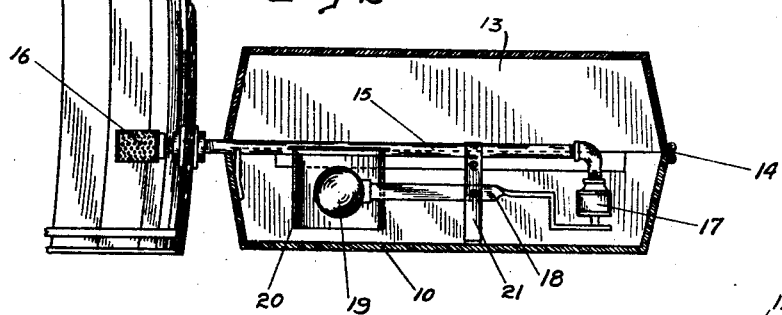
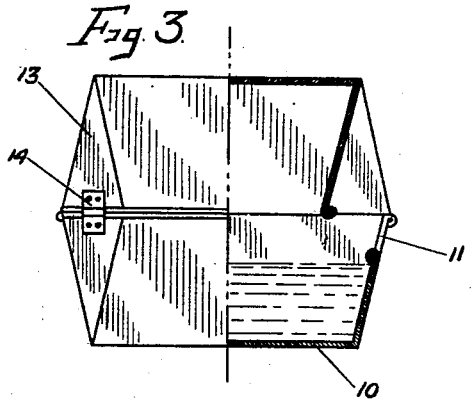
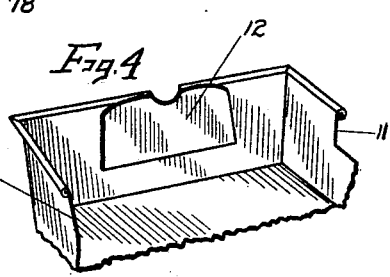
Inventor
ELI GRICE.
By Emil F. Lang,
Attorney Patented Jan. 3, 1928.

1,654,802

UNITED STATES PATENT OFFICE.

ELI GRICE, OF GARRISON, NEBRASKA.

POULTRY FOUNTAIN.

Application filed March 21, 1927. Serial No. 177,071.

My invention relates to poultry and stock fountains and its primary object is the provision of a fountain which is easily accessible to the animals without giving the animals the opportunity of entering the fountain and to thus foul the contents, the fountain being designed so that it may be easily cleaned and kept clean. Another of my objects is the provision of a fountain of extreme simplicity so that the fountain may be easily manufactured at low cost, so that its simplicity will result in greater sanitation and so that the fountain will not be liable to get out of order in its normal use.

Having in view these objects and others which will be pointed out in the following description, I will now refer to the drawings, in which Figure 1 is an illustration showing the poultry fountain as it appears when in use.

Figure 2 is a median sectional view taken lengthwise of the fountain.

Figure 3 is a view of the poultry fountain partly in transverse section and partly showing the end of the fountain.

Figure 4 is an illustration of a portion of the fountain showing the end of the lower pan and the support for the inlet pipe.

The fountain includes two pans which have been modified to adapt them especially for use as a poultry fountain. The pans themselves have the size and shape of pans which are frequently used in baking. Both pans are, however, separately modified as shown particularly in Figure 1.

The lower pan 10 is the one which contains the water. This pan is cut away on both of two opposite sides at 11 and the cutaway wall is inturned so as to leave no rough edges. At one end this pan is provided with a rounded notch for receiving the inlet pipe and the pan is further strengthened by a reinforcing plate 12 having a similar notch, the plate being secured to the pan as by riveting, welding or soldering.

The upper pan 13 is secured to the lower pan 10 by means of hinges 14 at the outer edge. The pan is, however, modified by changing the position of the entire side walls so that they converge instead of diverge. When the two pans are in their closed position as shown in Figure 1, the upper pan furnishes an effective shield and covering for the fountain and it permits the chickens to drink from the water without coming in contact with the mechanism for delivering water to the fountain and without permitting the chickens to enter the tank and to thus foul the water. The end walls are entirely closed so that the only access is from the two sides, the side walls of both pans being so modified that the fountain is convenient of access to the chickens without the usual drawbacks associated with such conveniences.

The water is led into the fountain through a pipe 15 which is connected with any suitable source of supply. As shown in the illustration this supply may be a barrel and in this instance a filter 16 is desirable for purifying the water before it leaves the barrel. At the outlet end of the pipe 15 is a valve 17 which is automatically controlled through a lever 18 in response to the usual float 19. The float is protected by a cylinder 20 which surrounds the float, the wall of the cylinder being slitted to permit the movement of the lever 18. The cylinder 20 is firmly secured to the pipe 15. The pipe 15 is further supported on the support 21 to which the lever 18 is pivotally connected. The parts 15 to 21 inclusive therefore form an outturned construction which is not secured in any manner to the pans.

The fountain itself consists of a drinking pan and a cover, the cover being so arranged that the animals have easy access to the water for drinking purposes. The drinking pan and cover are hinged together and when it is desired to clean the pan, the cover need only be thrown back on its hinge to give access to the entire interior of the fountain. Neither part has any difficult corners and the pan and cover may be completely scrubbed without much effort and in almost no time. The lower pan may be lifted entirely away from the water feed and the various parts of the water feed may then be externally cleaned. In fact, the valve 17 and the strainer 16 as well as all other parts of the water feed are so designed that they may be opened so that their interior surfaces may be cleaned whenever necessary. The idea of sanitation is paramount and the design is such that sanitation is obtained with the least expenditure of time.

I have shown and described my invention with particular reference to its use as a poultry fountain. It is obvious, however, that if constructed on a slightly larger scale, the fountain will be found to be equally useful with hogs or even with the larger farm animals and that the advantages of the fountain are the same whether used for watering poultry or cattle or hogs.

Having thus described my invention in such full, clear, and exact terms that its construction and utility will be readily understood by others skilled in the art to which it pertains, what I claim as new and desire to secure by Letters Patent of the United States is:

1. An animal watering fountain including a water receptacle having upwardly diverging side and end walls, the side walls throughout a portion of their length terminating below the level of the end walls, and a cover hingedly connected to said water receptacle, said cover having downwardly diverging end walls and downwardly converging side walls.

2. An animal watering fountain including a water receptacle having upwardly diverging side and end walls, the side walls throughout a portion of their length terminating below the level of the end walls, means for automatically conducting a supply of water to said water receptacle, said conducting means entering said water receptacle at one end thereof, and a cover hingedly connected to said water receptacle at the end opposite the end at which said conducting means enters the water receptacle.

3. An animal watering fountain including a water receptacle having upwardly diverging side and end walls, the side walls throughout a portion of their length terminating below the level of the end walls, means for automatically conducting a supply of water to said water receptacle and for maintaining the water level in said water receptacle constant, and a cover hingedly connected to said water receptacle at one of the ends thereof, said cover having downwardly diverging end walls and downwardly converging side walls.

In testimony whereof I affix my signature.

ELI GRICE.